May 18, 1926. 1,584,990
J. J. NESBITT
DAMPER FOR HEATING AND VENTILATING UNITS
Filed March 21, 1924

INVENTOR.
JOHN J. NESBITT.
BY Aaron L. Applebaum
ATTORNEY.

Patented May 18, 1926.

1,584,990

UNITED STATES PATENT OFFICE.

JOHN J. NESBITT, OF ATLANTIC CITY, NEW JERSEY.

DAMPER FOR HEATING AND VENTILATING UNITS.

Application filed March 21, 1924. Serial No. 700,820.

This invention relates to dampers for heating and ventilating units and more particularly to a novel and improved construction for controlling the admission of fresh air through the apparatus.

In the conventional type of heating and ventilating units now employed in public buildings, school houses and institutions, the units are positioned preferably below a window sill and are provided with intake louvres and recirculating louvres in the upper portion of the unit casing. It has been the practice in the past to regulate the admission of fresh air through the louvres by suitably connected shutters or doors operable by levers and bell cranks. This construction has not proved satisfactory because the shutters do not operate smoothly, the lever and bell crank arrangement become loose or disconnected and the fresh air supply cannot be efficiently regulated. In some instances, the failure of one of the shutters to operate, renders the lever and bell crank mechanism totally inoperative with the result that the ventilating unit fails to function.

In order to overcome the above difficulties and objections, I employ a single damper which is somewhat in the nature of a hood, positioned in the upper portion of the ventilating unit between the intake and recirculating grille, thus dispensing with the use of shutters or doors and their operating mechanism.

Reference being had to the accompanying drawing showing a preferred embodiment of my invention, Fig. 1 is a vertical sectional view through the heating and ventilating unit, showing the damper in its open position.

Figure 1:
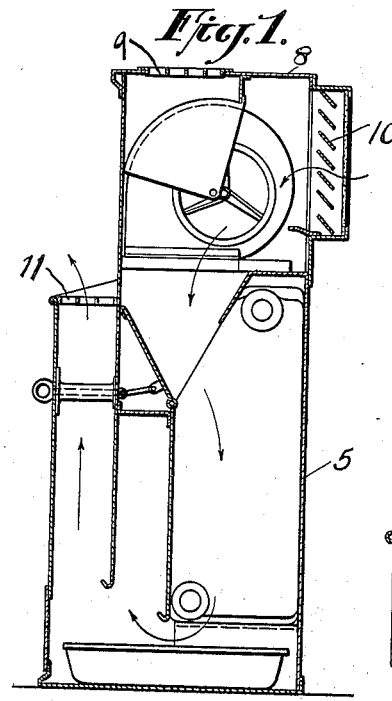

In the drawings 5 designates in its entirety the heating and ventilating unit or casing, 6, 7 the sides and 8 the top. The top is provided with a recirculating grille 9, adjacent the front thereof. In the rear wall and upper portion of the ventilating unit, the intake, stationary louvres 10 are positioned in line with the motor, fan housing and fan whereby the fresh air is driven through the apparatus and outlet grille 11, in the manner well known and understood by those skilled in the art.

Figure 2:
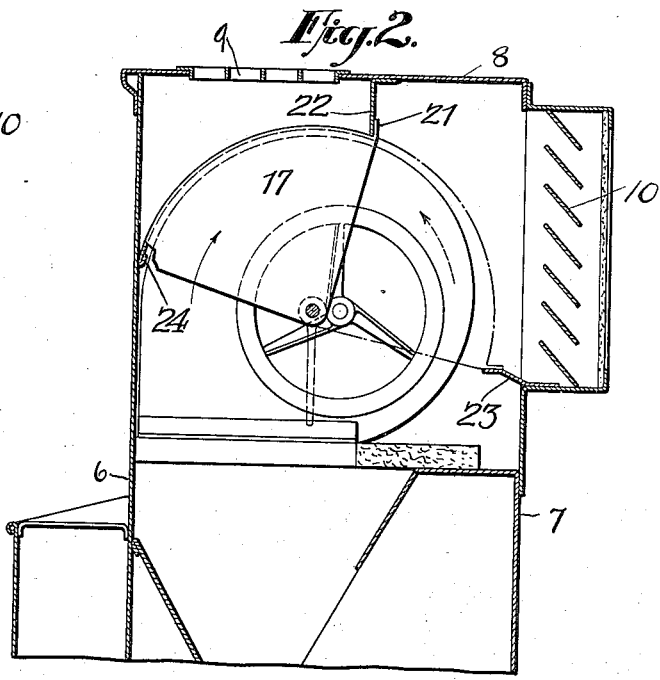
Fig. 2 is an enlarged, fragmentary, sectional view of the upper portion of the unit, the closed position of the damper being shown in dotted lines.
Figure 3:
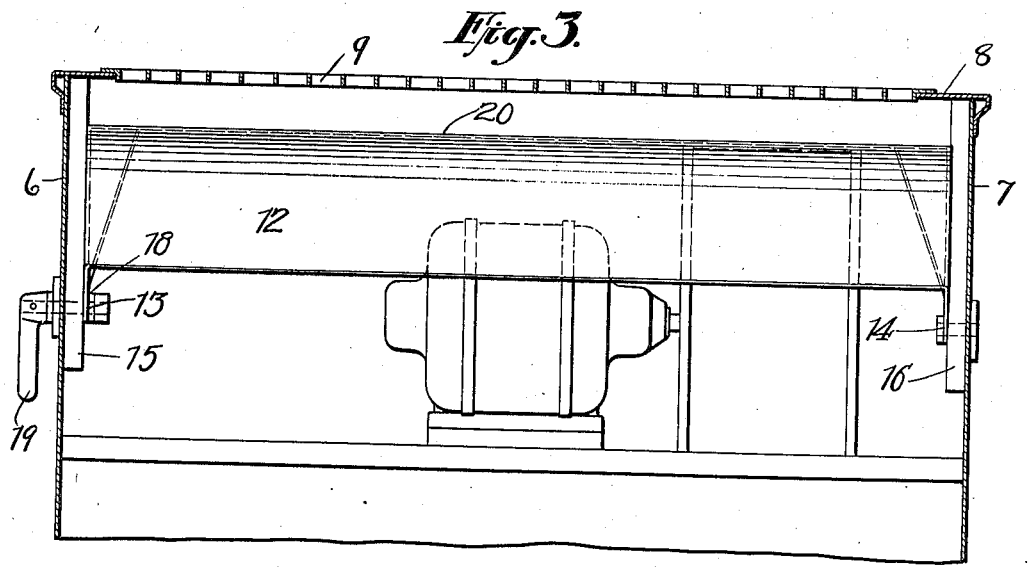
Fig. 3 is a horizontal view showing the damper and its operating lever with respect to the unit casing.

My invention proper resides primarily in the construction and arrangement of the damper positioned in the upper portion of the ventilating unit for controlling the admission of fresh air entering the stationary intake louvres and passing through the recirculating grille in the top of the said unit. To that end, I have provided a hood shaped, substantially triangular damper 12, journaled at 13, 14, between the sides of the unit. Spacing or filler pieces 15, 16 are interposed between the ends 17 of the damper and the sides 6, 7. The said ends 17 of the damper are preferably provided with extensions 18 for properly journalling the hood and permitting its rotation by means of the handle or lever 19. The curved top portion 20 of the damper is further provided with a flange 21 which is adapted to engage an L-shaped abutment or stop 22 depending from the top 8 of the unit. Adjacent the bottom of the fixed intake louvres there is provided a bent plate 23 which acts as a stop for the flange 21 of the damper when the latter is moved to its closed position, as indicated by the dotted lines, see Fig. 2. The front edge 24 of the curved top of the damper is preferably bent upon itself thus forming a reenforced edge that engages the front wall of the unit when the damper is open.

From the above construction, it will be seen that my single, hood shaped damper constructed and arranged in the manner above described, permits of the proper control of the fresh air through the fixed intake louvres and recirculating grille, dispenses with shutters or doors and their operating mechanism, renders the damper easy to operate, decreases the weight of the unit, reduces the number of parts to a minimum and otherwise increases the efficiency required in apparatus of this character.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the subject matter being claimed.

Having shown and described my invention what I now claim as new and desire to secure by Letters Patent of the United States is:—

1. In a heating and ventilating unit having a blower chamber, a fresh air intake in the rear wall, an opening in the bottom and a recirculating opening in the top wall of said chamber, a single damper pivoted between the sides of the blower chamber for controlling the passage of air through the air intake in the rear wall and recirculating opening in said top of the chamber.

2. In a heating and ventilating unit having a blower chamber, a fresh air intake in the rear wall, an opening in the bottom and a recirculating opening in the top wall of said chamber, a single damper pivoted between the sides of the blower chamber for controlling the passage of air through the air intake in the rear wall and recirculating opening in the top of the chamber and an operating handle for said damper.

3. In a heating and ventilating unit having a blower chamber in the top, a fresh air intake in the rear wall, an opening in the bottom and a recirculating opening in the top wall of said chamber, a single hood shaped damper pivoted between the sides of the blower chamber and movable in the arc of a circle between the front wall and rear wall for controlling the passage of air through the air intake in the rear wall and recirculating opening in the top of said chamber and means for actuating said damper from one side of said chamber.

4. In a heating and ventilating unit having a blower chamber in the top, a fresh air intake in the rear wall, an opening in the bottom and a recirculating opening in the top wall of said chamber, a single curved damper pivoted between the sides of the blower chamber, the ends of said damper being substantially triangular and its depth substantially one half the distance between the front and rear walls of said chamber, and an operating handle for manipulating said damper between said rear wall and front wall for regulating the passage of air through the fresh air intake and the recirculating opening of said chamber.

In testimony whereof I have affixed my signature this 17th day of March, 1924.

JOHN J. NESBITT.